Sept. 27, 1932.  W. E. N. MASSICOTTE  1,879,384
CONVEYER SYSTEM
Filed Feb. 27, 1931   6 Sheets-Sheet 2

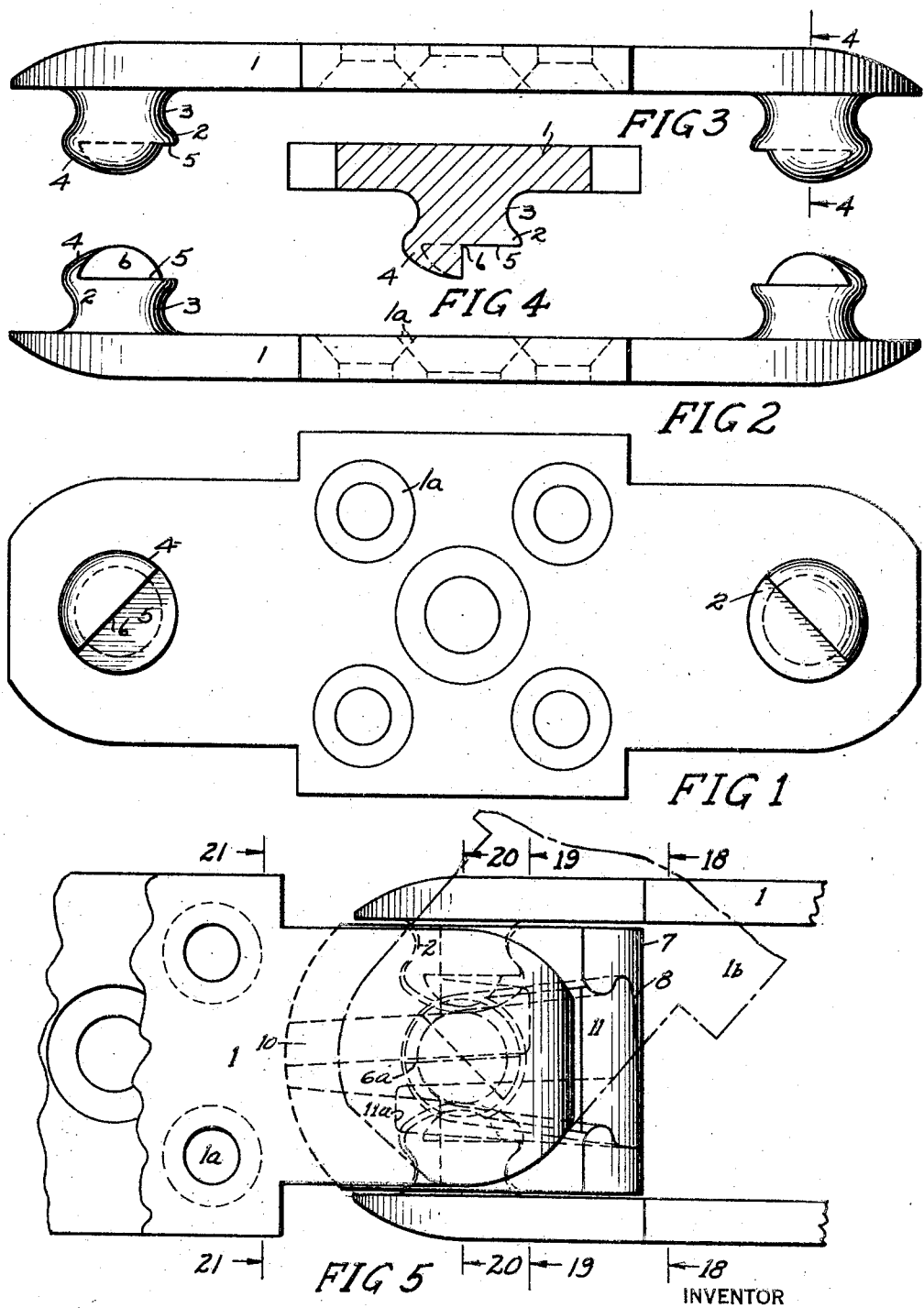

INVENTOR
BY *William E. N. Massicotte*
*Gerard F. Baldwin*
ATTORNEY

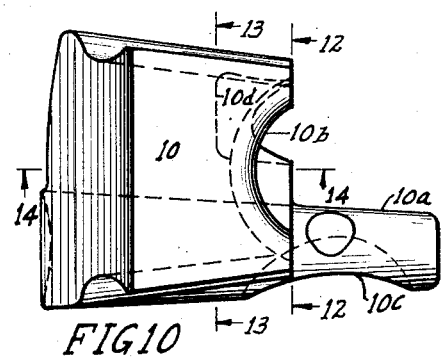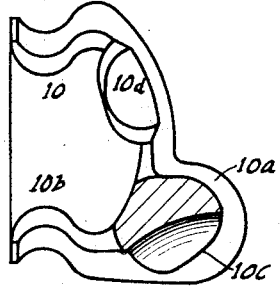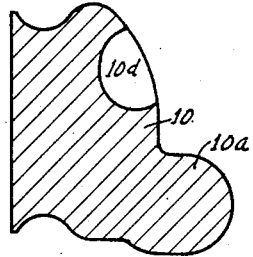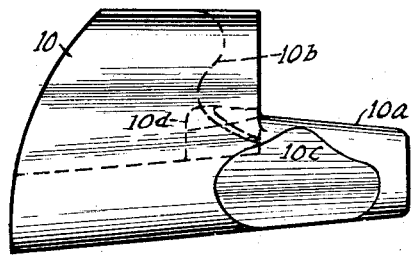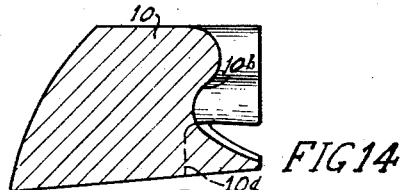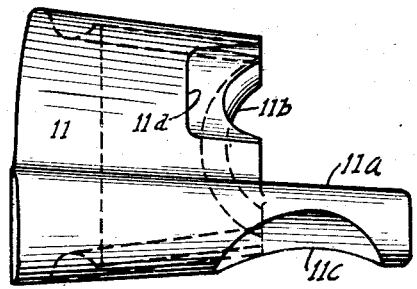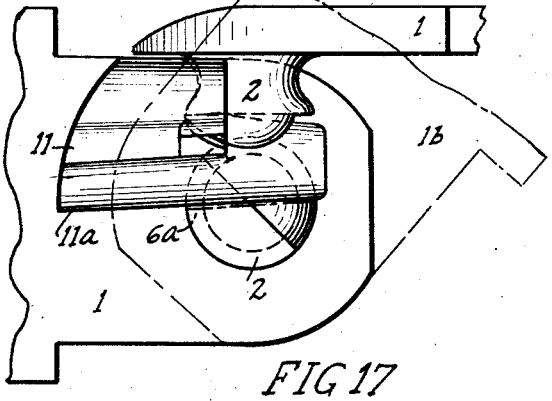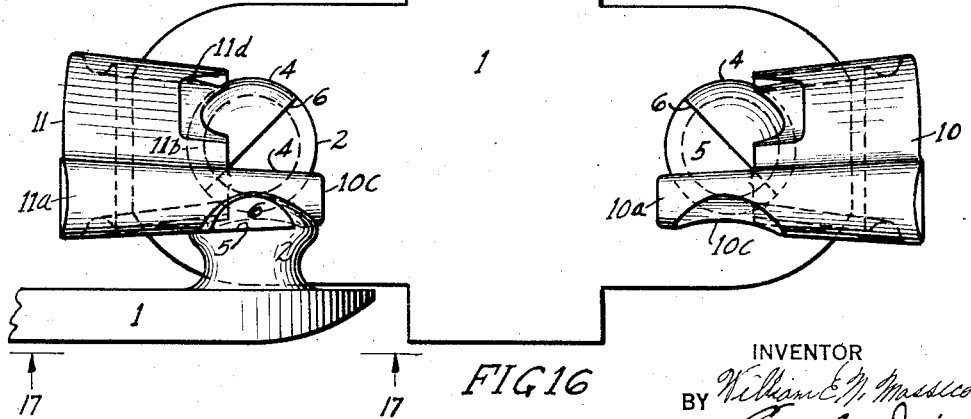

Sept. 27, 1932. W. E. N. MASSICOTTE 1,879,384
CONVEYER SYSTEM
Filed Feb. 27, 1931 6 Sheets-Sheet 5

INVENTOR
William E. N. Massicotte
BY
Gerard S. Baldwin
ATTORNEY

Sept. 27, 1932.  W. E. N. MASSICOTTE  1,879,384
CONVEYER SYSTEM
Filed Feb. 27, 1931    6 Sheets-Sheet 6

INVENTOR
BY William E. N. Massicotte
Grace Baldwin
ATTORNEY

Patented Sept. 27, 1932

1,879,384

UNITED STATES PATENT OFFICE

WILLIAM E. N. MASSICOTTE, OF DETROIT, MICHIGAN

CONVEYER SYSTEM

Application filed February 27, 1931. Serial No. 518,684.

This invention relates to improvements in conveyer systems, and refers both to a specially constructed chain the links of which are adapted to swing to excessive angles relative to the links adjacent to them, and also to special guide sprockets around which the chain travels freely and steadily when turning sharp curves.

It is an object of the invention to provide a conveyer chain wherein the links are arranged in pairs alternately horizontally and vertically disposed, and wherein the adjacent ends of each two pairs of links are pivotally mounted in a coupling block about intersecting axes.

Another object of the invention is to provide such a conveyer chain wherein the links adjacent their extremities are provided with projections or buttons which engage slots formed in the coupling blocks in which wedges are also provided so that each of the latter fills up the remainder of a slot occupied in part by a projection or button.

A further object of the invention is to provide such a conveyer chain wherein the projections or buttons are so formed that the button on each horizontal (or vertical) link normally holds the wedge arranged behind the button on an adjacent vertical (or horizontal) link against movement in its slot; thereby preventing movement of the link the button of which rests in the same slot as the held wedge in any other than a rotary direction about the axis of its button.

Yet another object of the invention is to provide such a conveyer chain wherein the coupling blocks and their slots, the links and their buttons, and the wedges are so formed that the links must be turned to very excessive angles relative to their normal positions to permit insertion or removal of the wedges in engagement with slots adjacent those in which the buttons integral with those links are housed.

The invention also aims to provide special forms of guide sprockets around which the chain passes when rounding inward or outward curves; the sprockets for inward curves are provided with spaced peripheral recesses to engage elements carried by the chain hangers and the sprockets for outward curves being formed in sections so that work carrying arms depending from the chain may extend between the said sections.

Another object of the invention is to provide a conveyer system wherein the various parts of the chain and the guide sprockets are relatively simple to manufacture and assemble, and wherein the parts are so constructed that the chain will travel freely and steadily around sharp inward or outward curves.

With these and other objects and advantages in view which will become apparent as the specification proceeds, the invention is hereinafter more fully described with the aid of the accompanying drawings, in which:

Figure 1 illustrates a plan view of a link showing the projections or buttons thereon.

Figure 2 is a side elevation thereof.

Figure 3 is another side elevation, and

Figure 4 is a section on the line 4—4 of Figure 3.

Figure 5 is an assembled view showing portions of two adjacent pairs of links and a coupling block.

Figure 8:
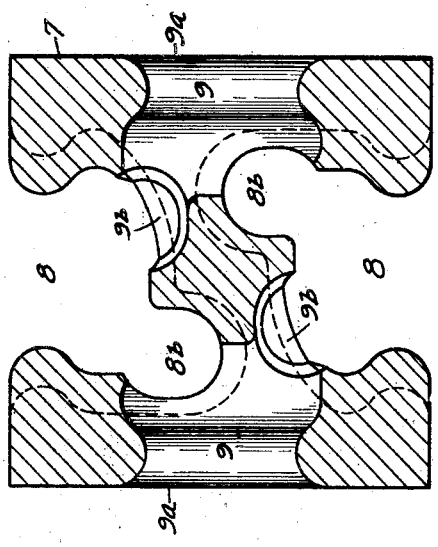
Figure 7:
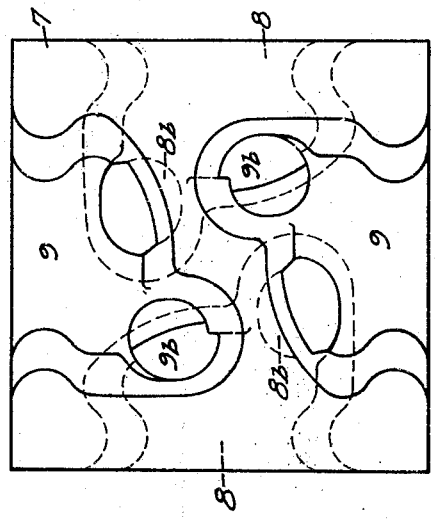
Figure 7 is an end view thereof.
Figure 6:
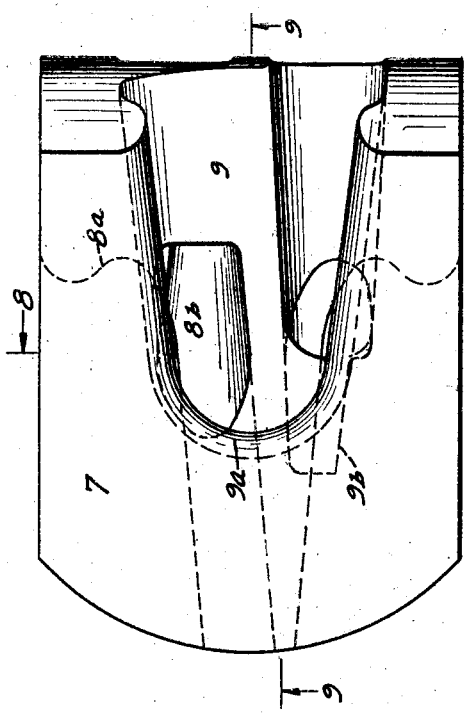
Figure 6 is a plan view of a coupling block.
Figure 9:
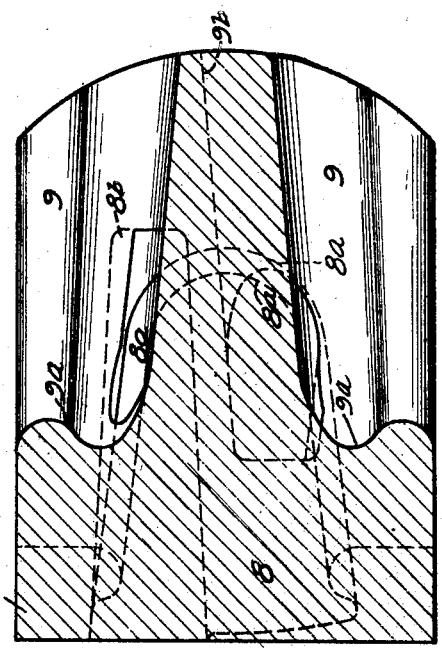
Figure 20:
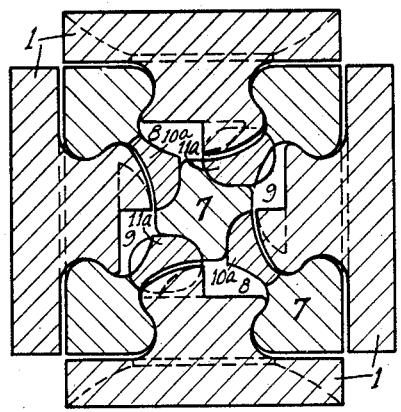
Figure 19:
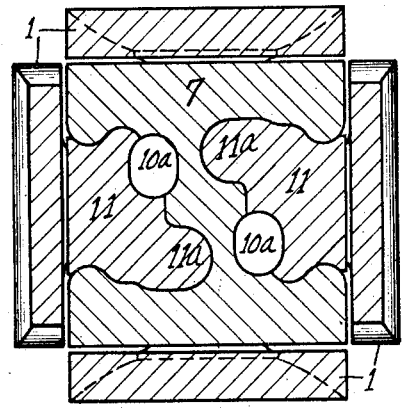
Figure 18:
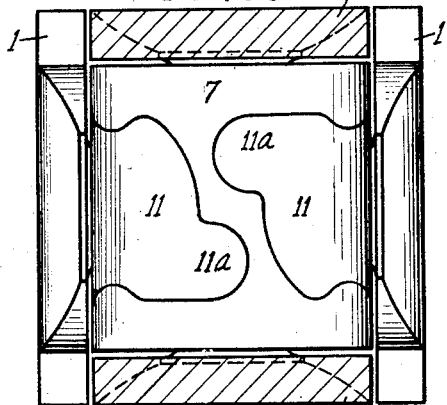
Figure 21:
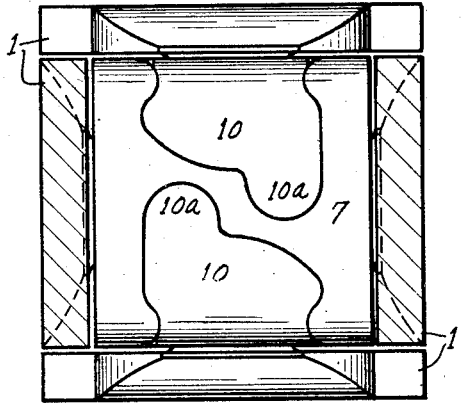

Figures 8 and 9 are sections on the lines 8—8 and 9—9 of Figure 6.

Figure 10 is a plan view of one wedge, and

Figure 11 is an elevation thereof.

Figures 12, 13 and 14 are sections on the lines 12—12, 13—13 and 14—14 of Figure 10.

Figure 15 is an inverted plan of the other wedge.

Figure 16 is a partial assembly showing two wedges and a link the buttons of which rest in the same coupling block grooves as the wedges, and another link disposed at right angles to the first named link, the button on the other link normally holding one of the wedges in position.

Figure 17 is a partial view on the line 17—17 of Figure 16.

Figures 18, 19, 20 and 21 are sections on the lines 18—18, 19—19, 20—20 and 21—21 respectively of Figure 5.

Figures 22, 23, 24:
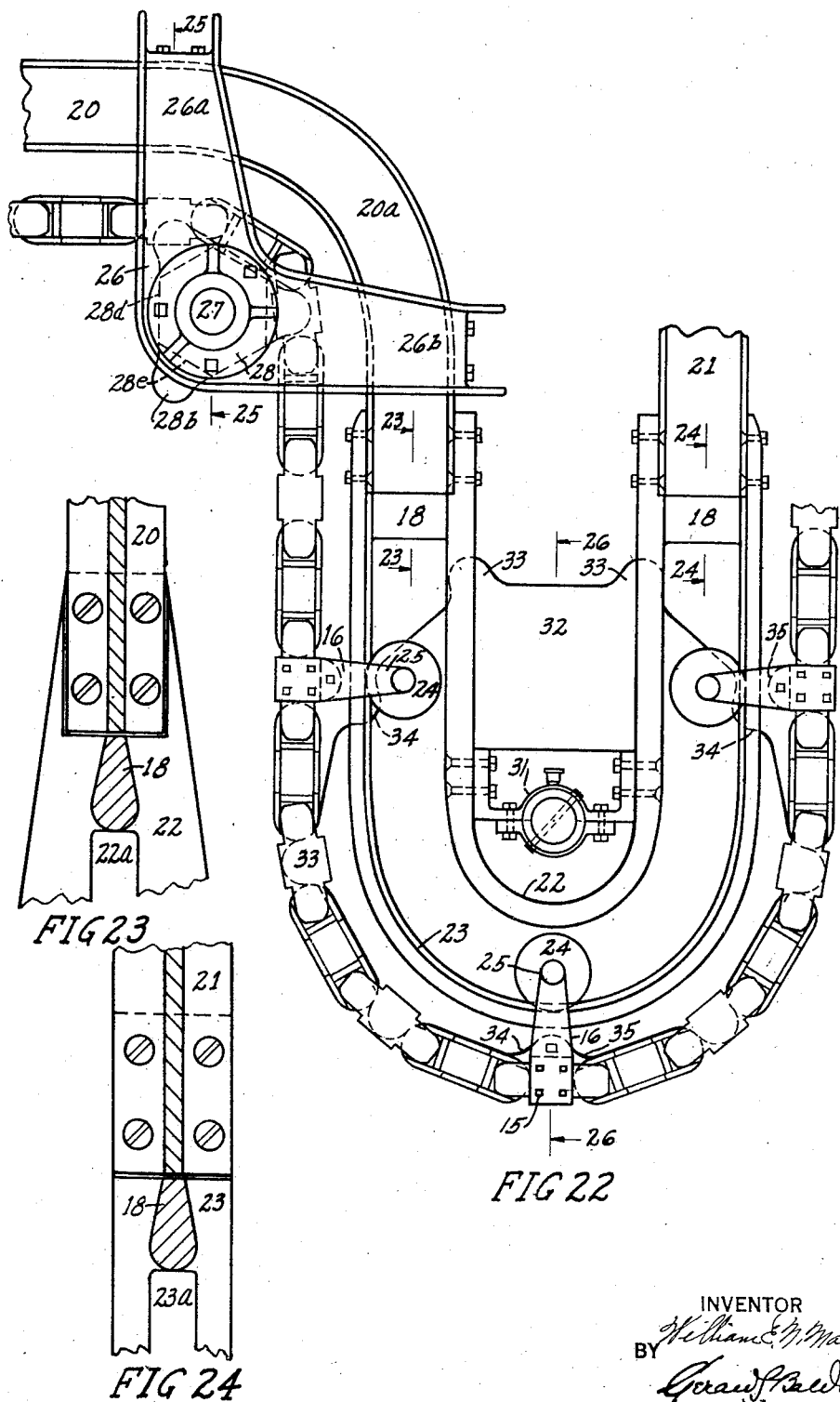
Figure 25:
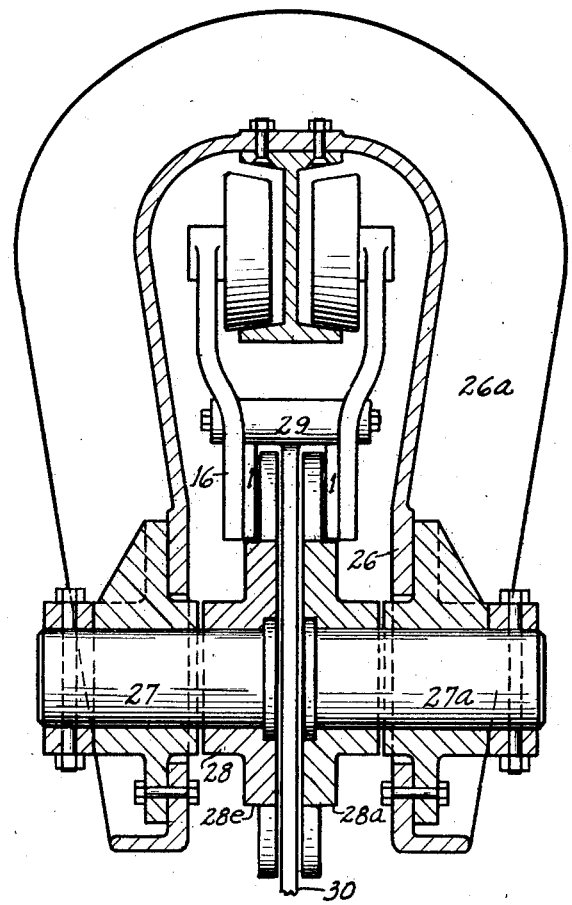
Figure 26:
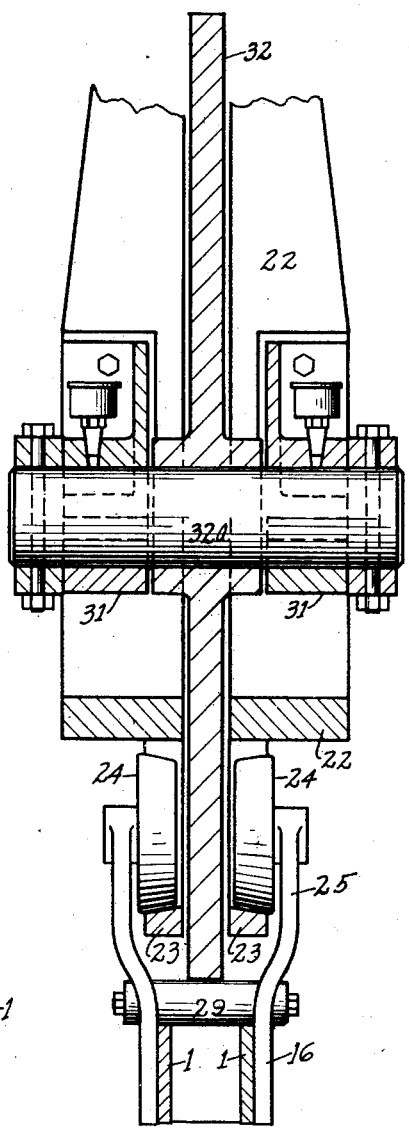

Figure 22 is a side elevation, on a reduced scale, showing a portion of the chain passing around guide sprockets on both internal and external curves.

Figure 27:
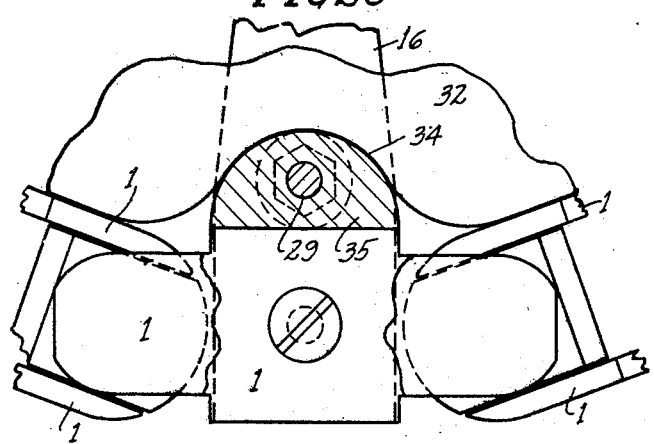

Figures 23, 24, 25 and 26 are enlarged sections on the lines 23—23, 24—24, 25—25 and 26—26 of Figure 22, and Figure 27 is a detail.

Referring to the drawings, and particularly to Figures 1 to 4 thereof, 1 designates a link which consists of a flat piece of material provided towards its extremities with lateral projections or buttons 2. The latter are circular in form and are necked at 3 intermediately of their length. Substantially one-half of the outer face of each button 2 is convex as shown at 4, and the other half is flat as shown at 5. The flat portions 5 do not project outwardly as far as the convex portions 4 so that a substantially diametrally disposed shoulder 6 is formed across the outer face of each button 2 along the adjacent margins of the flat and convex portions 5 and 4. It will be noted that the shoulders 6 are preferably so formed that they lie at substantially 45 degrees to the longitudinal centre line of the links, at substantially 90 degrees to one another, and with the convex portions 4 of the buttons 2 outwardly disposed towards the adjacent ends of the links 1.

Figures 6 to 9 inclusive show one of the coupling blocks 7 each of which has two pair of opposed slots 8 and 9 formed longitudinally therein. The slots 8 extend from one extremity of the block for a portion of its length and are formed in its horizontal sides, and the slots 9 extend from the other extremity of the block for a portion of its length and are formed in its vertical sides. The slots 8 and 9 at their inner extremities are substantially semi-circular as shown at 8a and 9a; these slots are also narrower adjacent the outer faces of the block and wider beneath said narrower portions to correspond to the form of the buttons 2 which they receive. It will also be noted that the inner ends 8a and 9a of the slots are relatively so positioned that the axis of the semi-circular portions 8a intersects the axis of the semi-circular portions 9a. Formed so as to extend inwardly further from the face of the block 7 in which the slots 8 and 9 are formed are slot extensions 8b and 9b respectively which are disposed on the right and left sides of their respective slots. Each slot extension 8b and 9b opens into the underside of one of the slots 9 and 8 disposed at right angles to it.

Figures 10 to 15 inclusive show details of the wedges. Figures 10 to 14 show a right hand wedge 10, and Figure 15 shows a left hand wedge 11. The wedge 10 is provided on its underside with a projection 10a which engages a slot extension 8b; the inner face of this wedge has a substantially semi-circular concavity 10b formed therein, and in the outer side of the extension 10a a relatively slight concavity 10c is formed adjacent its inner extremity. Similarly the wedge 11 is provided with an integral extension 11a (which engages a slot extension 9a) in which a relatively slight concavity 11c is formed in its outer side adjacent its inner extremity, and in the inner face of the wedge itself a substantially semi-circular concavity 11b is formed. The difference between the wedges 10 and 11 lies in the fact that the extensions 10a and 11a occur on opposite sides since the slot extensions 8b and 9b in which they are to seat are provided on opposite sides of their slots 8 and 9. Again in the inner face of each wedge 10 and 11 a recess 10d and 11d is formed to receive the inner extremity of another wedge extension 11a or 10a which, when the various parts are assembled, lies at right angles to it.

Figures 5 and 18 to 21 inclusive show assemblies of the links, wedges and coupling blocks, and Figures 16 and 17 show partial assemblies. From these views it is thought that it will be apparent that opposed pairs of buttons 2 on horizontal links 1 are held contiguous to the semi-circular inner extremities 8a of the slots 8 by the concavities 10b formed in the inner faces of the wedges 10. Again, each wedge 10 is held against longitudinal movement in its slot 8 by a button 2 integral with an adjacent vertical link 1 which engages the concavity 10c formed in the extension 10a of that wedge. Similarly the buttons 2 of the vertical links 1 are held contiguous to the semi-circular inner extremities 9a of the slots 9 by the wedges 11, which are in turn held against longitudinal movement in their slots 9 by buttons 2 integral with horizontal links 1 which engage the concavities 11c formed in the extensions 11a of the said wedges 11. It should also be stated that the terms "horizontal" and "vertical" are herein employed only to clarify the description since at one end of each link 1, whether horizontally or vertically disposed, a right hand wedge is employed and at its opposite end a left hand wedge.

Thus the purpose of the substantially semi-circular convex portions 4 on the outer extremities of the buttons 2 is to engage concavities 10c and 11c formed in the wedge extensions 10a and 11a arranged behind other buttons disposed adjacent but at right angles to the first named buttons. And the purpose of the flat portions 5 on the outer extremities of the buttons 2, which do not extend outwardly as far as the convex portions 4, is to permit insertion or removal of the wedges 10 and 11 lying at right angles to them when the links 1 with which the said buttons are integral are turned (as indicated at 1b in Figures 5 and 17) to such an angle that the shoulders 6 (as shown at 6a in Figures 5 and 17) of the buttons 2 are beneath and substantially in alignment with the undersides of the wedges to be removed.

From Figures 16 and 17 it will be seen that in order to liberate and permit removal or insertion of one of the wedges 10 or 11 one of the links 1 at right angles to the one the button on which that wedge holds must be turned through substantially 135 degrees to its normal position. Then the shoulder 6 on the button 2 integral with the turned link 1 is so positioned as to be in alignment with the underside of the wedge 10 or 11 to be removed, and the flat portion 5 of the outer face of the button on the turned link is opposite to but clear of the wedge extension concavity 10c or 11c of the wedge to be removed. Then the wedge 10 or 11 may be drawn outwardly from its slot 8 or 9 past the button on the turned link so that the button behind which this wedge rests is then free to be disengaged from its slot 8 or 9. However as soon as the turned link is again moved appreciably rotarily a portion of the convex face 4 of its button engages the wedge extension concavity 10c or 11c and removal of the wedge becomes impossible.

It will also be noted that the links 1 are so arranged relative to the coupling blocks 7 that the buttons 2 pull against the closed substantially semi-circular slot ends 8a and 9a. Intermediately of their length the links 1 are preferably suitably apertured as indicated at 1a in Figure 1 for fastening means as shown at 15 in Figure 22 in which case the said means are employed for attaching the links to truck hangers 16. The apertures 1a are preferably countersunk on their inner sides of the links so that the heads of fastening means may lie flush with the said inner sides. From the foregoing it will also be seen that the purpose of inclining the shoulders 6 in opposite directions at opposite ends of the links 1 is so that in every case a link lying at right angles to a wedge to be removed must be turned to 135 degrees to its normal position to permit insertion or removal of the wedge. The angle mentioned, namely 135 degrees, is of course merely an arbitrary one and may be varied to suit conditions, but in actual practice it is found that a link does not swing relative to its block to more than 90 degrees, so that an angle of 120 degrees instead of 135 would prove just as satisfactory.

Referring to the conveyer embodiment shown in Figures 22 to 27 inclusive, 20 and 21 indicate conventional lengths of monorail of I-beam section. The length 20 is outwardly curved at 20a, and the adjacent ends of the lengths 20 and 21 are connected by means of inner and outer concentric U-shaped strips 22 and 23 which are preferably flat in cross section and in the present instance having openings 22a and 23a respectively formed longitudinally therein intermediately of their length and width. The strips 22 and 23 are also integral with one another in this case and are connected at their extremities by transverse webs 18. The strips 22 and 23 constitute guideways for the wheels 24 of trucks 25 which also travel along the monorail lengths 20 and 21.

26 is a bracket having two integral U-shaped portions 26a and 26b which are disposed to one another at the same angle as that through which the rail curve 20a extends. These U-shaped portions 26a and 26b extend over the upper flange of the monorail 20 to which they are suitably attached. The bracket 26 forms bearings for two pins 27 and 27a which are in axial alignment with one another. On the adjacent extremities of these pins sprockets 28 and 28a are mounted which extend upwardly between opposed pairs of vertical links 1 and travel adjacent the inner sides of the latter so as to eliminate sidesway of the chain. Depending from the trucks 25 are the hangers 16 which are secured to some of the vertically disposed links 1 in the manner hereinbefore described.

Between teeth 28b and 28c of the sprockets 28 and 28a the peripheral portions of the latter are so formed as to support the lower horizontally disposed links 1 adjacent both their extremities thereby insuring that the links travel steadily and freely around the curve so that slackness of the chain and consequent jerking does not occur. Outward flanges 28e integral with the sprockets 28 and 28a are formed adjacent the outer sides of the teeth 28b and 28c of the said sprockets. These flanges constitute rests for the undersides of the links 1 and also guide them around the curve to further steady the travel of the chain.

Transversely between the hangers 16 and supported by the latter are elements 29 substantially centrally from which work hangers 30 depend so that they may pass freely between the sprocket wheels 28 and 28a.

Extending across the inner portion of the U-shaped strip 22 are aligned bearings 31 the axis of which is coincident with the axis of the intermediate rounded portions of the U-shaped strips 22 and 23. Mounted on a shaft 32a supported by the bearings 31 and between the latter is a sprocket wheel 32. The latter is provided both with teeth 33 which enter the chain between some opposed pairs of vertical links 1, and also with recesses 34 which engage members 35. The undersides of the latter rest on other vertical links 1 and the said members 35 are also supported by the elements 29 which pass through them. Between the teeth 33, and adjacent recesses 34, the periphery of the sprocket wheel 32 is flat to afford bearing surfaces for the upper horizontal links 1 to bear against, thereby providing guidance for the chain so that it travels steadily around the curve, as it is deemed of importance to eliminate the possibility of a jerky, intermittent chain movement.

From the foregoing it will be seen that the chain is so constructed that each pair of links may turn freely to an excessive angle relative to both coupling blocks by which that pair is connected to other adjacent pairs of links. Again the sprocket wheel sections 28 and 28a provide both peripheral bearing surfaces for the lower horizontal links substantially throughout the length of the latter, and the flanges 28e similarly afford bearing surfaces for the undersides of vertical links. The sprocket wheel 32 is provided both with teeth 33 and recesses 34, and the members 35 which engage the latter permit chain guidance to occur at points where a work hanger 30 depends between vertical links which would interfere with the teeth of the sprocket 32.

While the preferred embodiment of the invention has been described and shown it is understood that the construction is susceptible to such alterations and modifications as fall within the scope of the appended claims.

What I claim as my invention and desire to secure by Letters Patent is:

1. A conveyer chain comprising a plurality of substantially flat links having laterally disposed buttons thereon, said links being arranged in opposed pairs, coupling blocks having slots therein, the buttons on the adjacent extremities of two pairs of links engaging the slots in each block, and means holding said buttons against other than rotary movement in their block slots.

2. A conveyer chain comprising a plurality of substantially flat links having laterally disposed buttons thereon, said links being arranged in opposed pairs, each pair of links being disposed substantially at right angles to both pairs of links terminating adjacent its extremities, coupling blocks having slots formed longitudinally in their sides for a portion of the length of the latter, the buttons on the adjacent extremities of two pairs of links engaging the slots in each block, and means holding said buttons against other than pivotal movement in their block slots.

3. A conveyer chain comprising a plurality of substantially flat links having laterally disposed buttons thereon, said links being arranged in opposed pairs, coupling blocks each having four slots formed longitudinally therein, each slot receiving one button of one of the links, and wedges in said slots one behind each button by which other than rotary movement of the buttons in their slots is prevented.

4. A conveyer chain comprising a plurality of substantially flat links having laterally disposed buttons thereon, said links being arranged in opposed pairs, coupling blocks having slots formed therein to receive one button on each of two pairs of links so that each pair may move pivotally relative to that coupling block, and said slots being so positioned that the two pairs of links swing about intersecting axes.

5. A conveyer chain comprising a plurality of substantially flat links arranged in opposed pairs, coupling blocks by which the adjacent extremities of two pairs of links are connected, each two pairs of links being so connected to a coupling block that both pairs are pivotally mounted thereon about intersecting axes.

6. A conveyer chain comprising a plurality of substantially flat links arranged in opposed pairs, laterally disposed buttons integral with said links adjacent their extremities, coupling blocks by which the adjacent ends of each two pairs of links are connected, each block having slots formed therein to receive a button in each slot, and a wedge in each slot behind the button therein, each wedge being normally held against movement in its slots by a button resting in another slot.

7. A conveyer chain comprising a plurality of substantially flat links having laterally disposed buttons adjacent their extremities, said buttons being arranged in opposed pairs and each pair of links being disposed at substantially ninety degrees to the two other pairs of links positioned adjacent its extremities, coupling blocks by which the adjacent ends of each two pairs of links are connected, each block having four slots formed therein to receive one button of each of four links, and a wedge in each slot behind each button, each wedge being normally held against movement in its slot by a button resting in another slot adjacent the one in which that wedge lies.

8. A conveyer link consisting of a substantially flat member having two laterally disposed buttons adjacent its extremities, said buttons being circular in form and having stepped outer faces.

9. A coupling block for a conveyer chain consisting of a four-sided block having a slot formed in each side, the slots in two opposite sides extending from one extremity of the block, and the slots formed in the other two opposite sides extending from the other extremity of the block.

10. A coupling block as specified in claim 9, wherein the inner extremities of all the slots are substantially semi-circular in form, and wherein the axis of the slot ends in one pair of slots intersects the axis of the slot ends formed in the other pair of slots.

11. A coupling block for conveyer chains comprising a rectangular block having a slot formed in each side and a slot extension in the base of each slot which opens into an adjacent slot disposed at right angles to the first named slot.

12. A wedge for conveyer chain couplings having an extension integral therewith, said extension being disposed on one side of the wedge and downwardly from its underside, the inner face of said wedge being concave, and the outer side of said extension having a recess formed therein.

13. A conveyer chain comprising a plurality of links having laterally disposed buttons adjacent their extremities, the outer faces of said buttons being stepped, said links being arranged in pairs alternately horizontally and vertically disposed, coupling blocks having longitudinal slots therein, one button on each of two pairs of links each engaging one slot in one coupling block, a wedge in each slot behind said buttons, and a portion of each wedge normally engaged by a stepped portion of a button lying in an adjacent slot.

14. A conveyer chain comprising a plurality of links having laterally disposed circular buttons adjacent their extremities, the outer faces of said buttons being stepped, said links being arranged in opposite pairs, said pairs of links being alternately horizontally and vertically disposed, a rectangular coupling block having a slot formed in each of its sides, two opposed slots extending from one extremity of the block and the other two opposed slots extending from the other extremity of the block, one button on each of two pairs of links being rotatable in each slot, a wedge in each slot holding the button in front of it against other than rotary movement, and each wedge being normally held against movement in its slot by engagement of its stepped outer face with a button in a slot angularly disposed relative to the slot in which that wedge rests.

15. A coupling block for a conveyer chain consisting of a four-sided block having a slot formed in each side, each slot extending from one extremity for a portion of its length and adapted to receive an integral portion of a link.

16. A wedge for conveyer chains having downward extensions thereon, said wedge being adapted to fit a conveyer block, and the inner extremity of the wedge being concave to retain an integral portion of a link in said block.

17. A conveyer chain comprising a plurality of substantially flat links having laterally disposed buttons adjacent their extremities, and coupling blocks the sides of which are slotted for a portion of their length from one extremity, said buttons being pivoted in said slots and bearing against the inner ends of the latter so as to exert a pulling strain thereon.

18. A conveyer chain comprising a plurality of links having laterally disposed buttons adjacent their extremities, coupling blocks the sides of which are slotted from one end for a portion of their length, said buttons being pivoted in said slots and bearing against the inner ends of the latter to exert a pulling strain on said blocks, and means holding said buttons against other than pivotal movement.

19. A conveyer chain comprising a plurality of links having laterally disposed buttons adjacent their extremities, coupling blocks the sides of which are slotted from one end for a portion of their length, said buttons being pivoted in said slots and bearing against the inner ends of the latter to exert a pulling strain on said blocks, and wedges in said blocks each holding one button against other than rotary movement, said wedges being normally held against movement in the blocks by a second button.

20. A conveyer chain comprising a plurality of links having lateral projections adjacent their extremities, coupling blocks having slots therein engaged by said projections, and wedges holding said projections against other than pivotal movement in their slots.

21. A conveyer chain comprising a plurality of links having lateral projections adjacent their extremities, coupling blocks having slots therein engaged by said projections, wedges holding said projections against other than pivotal movement in their slots, and means normally holding said wedges against movement in said blocks.

WILLIAM E. N. MASSICOTTE.